United States Patent [19]

Webb

[11] Patent Number: 4,805,444
[45] Date of Patent: Feb. 21, 1989

[54] SECONDARY CONTAINMENT SYSTEM

[76] Inventor: Michael C. Webb, 15 E. Uwchlan Ave., Exton, Pa. 19341

[21] Appl. No.: 103,206

[22] Filed: Oct. 1, 1987

[51] Int. Cl.[4] .............................................. G01M 3/04
[52] U.S. Cl. .................................... 73/40.5 R; 73/49.1
[58] Field of Search ................... 73/49.1, 49.5, 40.5 R; 137/93, 148, 155, 115, 104; 285/21, 31, 93

[56] References Cited

U.S. PATENT DOCUMENTS

| | | | |
|---|---|---|---|
| 3,459,229 | 8/1969 | Croft | 138/90 |
| 3,730,228 | 5/1973 | Gibbs, Sr. | 138/155 |
| 4,223,702 | 9/1980 | Cook | 138/155 |
| 4,667,505 | 5/1987 | Sharp | 73/40.5 R |
| 4,695,335 | 9/1987 | Lyall | 138/155 |

*Primary Examiner*—Michael J. Tokar
*Assistant Examiner*—Hezron E. Williams
*Attorney, Agent, or Firm*—Larson & Taylor

[57] ABSTRACT

A pipeline system is provided for a pumping system for fluid products, such as gasoline, diesel fuel and chemicals, and including a pump for pumping such products from a storage tank through through the primary pipeline of the pipeline system to a product dispenser. The pipeline system includes a secondary containment system for the primary pipeline between the tank and dispenser which includes telescoping pipe sections of different diameters. The telescoping piping is installed around the primary pipeline and the pipe sections are, prior to final installation, movable between intermediate and final positions, for enabling completion, testing and inspection of the primary pipeline prior to final completion of the secondary containment system. A fusion welding wire bond is provided between overlapping portions of the telescoping pipe sections for bonding these sections in the final positions thereof. An air test clamp assembly enables air pressure testing of the secondary containment system.

20 Claims, 5 Drawing Sheets

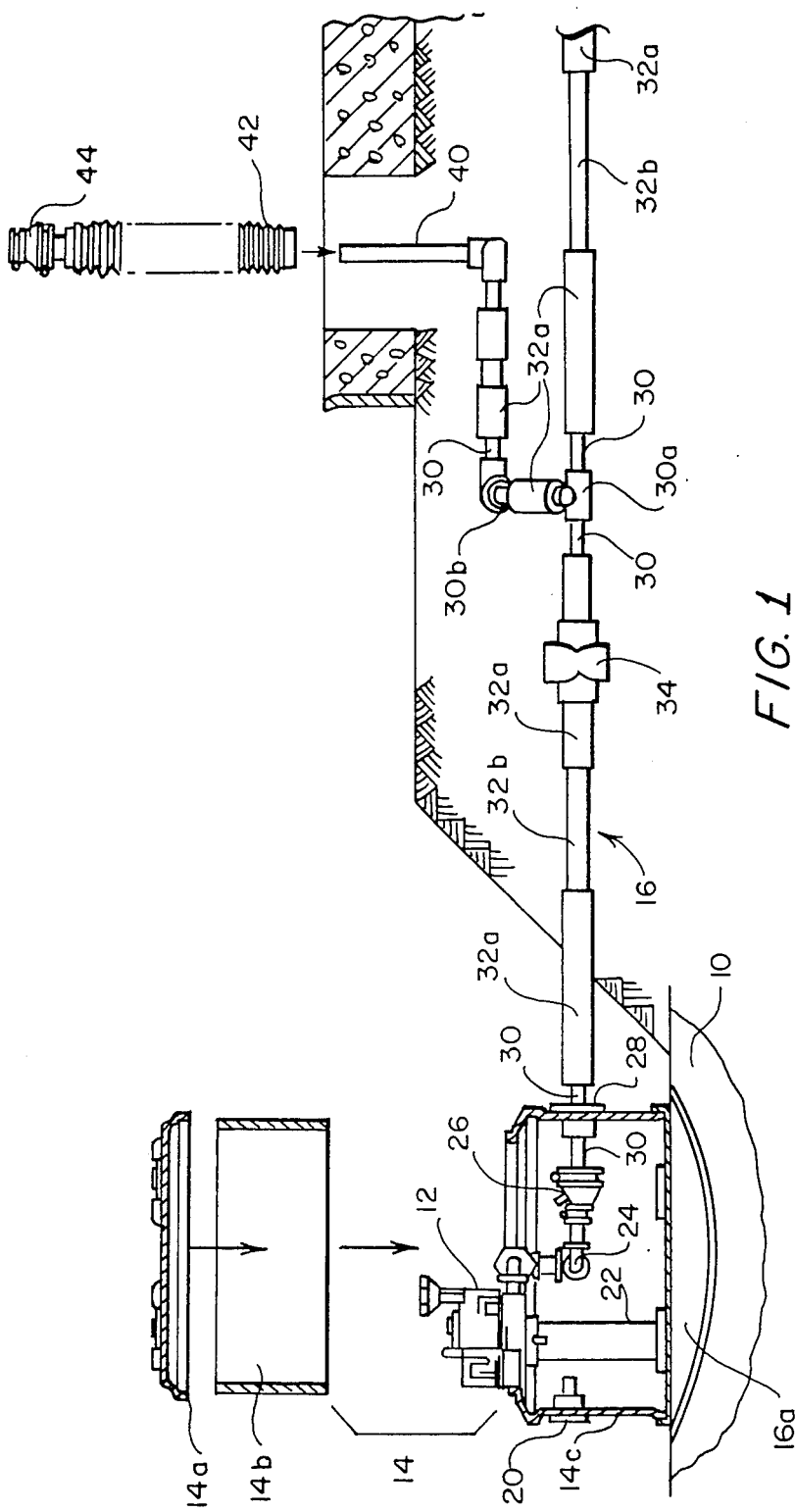

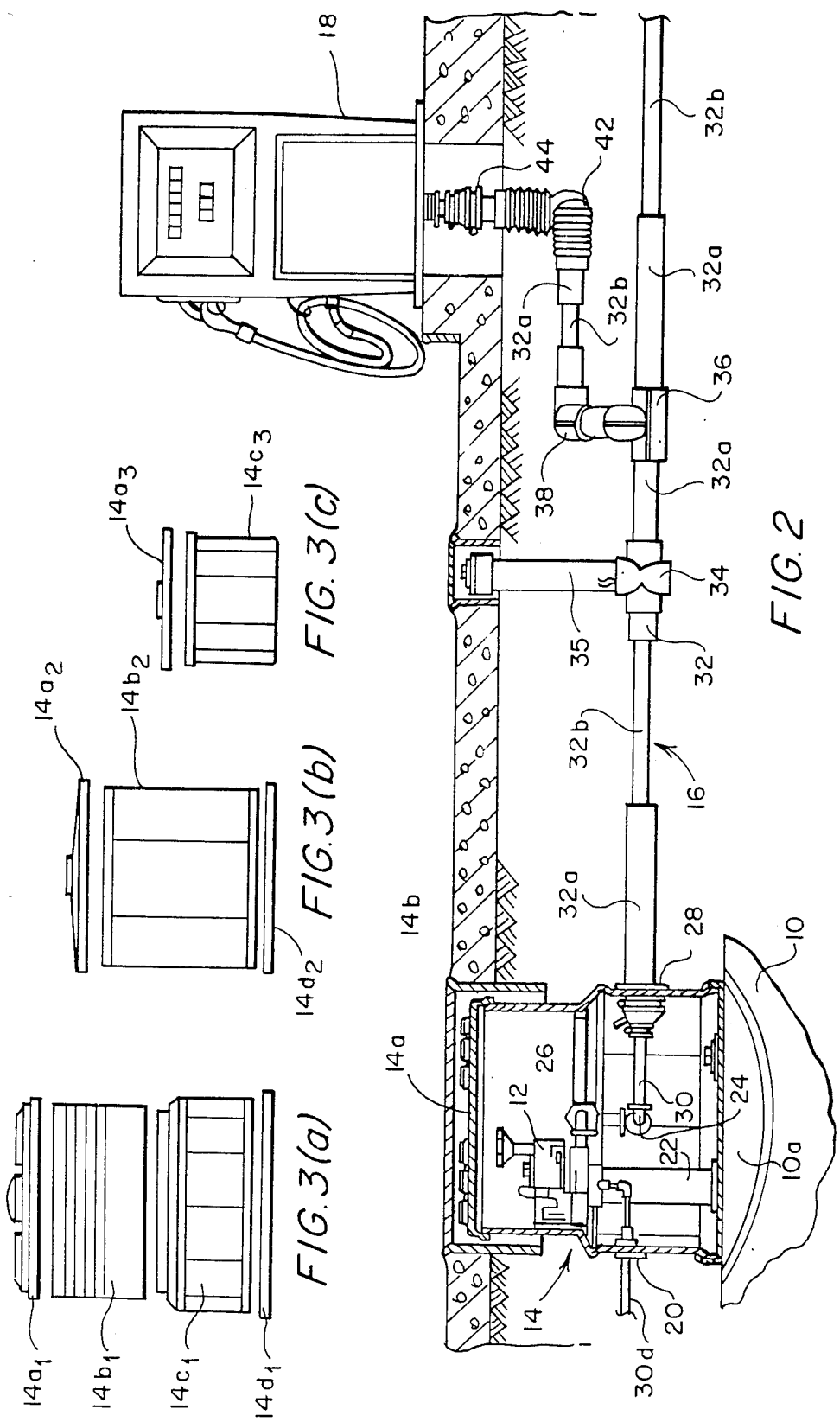

SECONDARY CONTAINMENT SYSTEM

CROSS REFERENCE TO RELATED APPLICATIONS

This application discloses subject matter closely related to that disclosed in my concurrently filed, corresponding application Ser. No. 103,469 entitled "Double Wall Piping System", the content of which is hereby incorporated by reference.

FIELD OF THE INVENTION

The present invention relates to a secondary containment system for subterranean piping systems used in dispensing of hazardous liquids such as gasoline, diesel fuel and a wide variety of chemicals.

BACKGROUND OF THE INVENTION

Subterranean piping systems such as are typically found at service stations are installed and connected to fuel dispensing pumps so as to provide dispensing of fuels from a fuel storage tank or tanks, usually installed below ground, to fuel dispensers, which are located above ground.

Conventionally, such underground piping systems comprise single wall pipes which are connected together on the site using standard straight pipes and associated fittings such as tees, 90° elbows, 45° elbows, and unions.

The underground storage tanks, the associated piping systems, and the fuel dispensers have all been determined to be sources of environmental pollution, as well as safety hazards because of leakage into the surrounding earth. Fire, explosions, and pollution of ground water have occurred because of these leakages.

With respect to the problem of leakage from underground fuel storage tanks, one solution has been to use double wall tanks, rather than conventional single wall tanks. Double wall steel tanks and double wall fiberglass tanks which are used to remedy this problem (together with a secondary containment and corrosion protection for the tanks) are disclosed in U.S. Pat. Nos. 4,568,925 (Butts) and 4,672,366 (Butts). The secondary containment system disclosed in these patents is applied to a conventional steel tank and creates a unique double wall tank referred to as a "jacketed steel tank". In the event of a leak in the inner primary tank, the leak is contained in the outer secondary tank. Most such double wall tanks are equipped with a leak detection device for signalling an alarm, in the event that a leak should occur.

While such tanks provide a partial solution, it has been determined that a substantial percentage of leakage which occurs at a typical service station site is due to leakage from the underground piping system. Various attempts have been made to deal with this problem. One approach is to install the piping in a trench line with a fuel impervious membrane liner or semi-rigid trough. This technique, if carefully installed, can provide a measure of containment of leakage from the piping system. However, such an approach does not offer truly effective leak detection. In particular, this technique does not permit a determination of when the leak occurred, or of the pipeline in which the leak is located, or of where in a specific pipeline the leak occurred. With such a system, should a leak occur, it may be required that all of the backfill contained within the trench or liner be removed. Further, integrity testing of such a system, by means of air pressure testing, is not possible. Further, in general, such systems do not provide 360° containment and thus fill with water, thereby eventually becoming ineffective.

A further solution to the problem of leakage from piping systems involves the use of fiberglass primary piping from the pump of the underground storage tank to the above ground fuel dispenser, this piping being encapsulated with an outer secondary fiberglass pipe and with fittings that are installed simultaneously with the primary pipe. The secondary pipe is, of necessity, of a larger diameter than the primary pipe so as to enable the secondary pipe to slide over the smaller primary pipe. The secondary fittings are of a clam shell design adapted to fit over primary fittings after the primary pipe has been bonded together, integrity tested and inspected. Secondary fittings are bonded to the secondary pipe by a combination of nuts and bolts, and through the use of fiberglass resins or a fuel resistant sealant. Such a solution does not permit a complete inspection of the entire primary piping system during an air pressure integrity test. Due to the construction and design of this system, the limited components available, and the bonding techniques used, it is difficult to install a system of this type which is air pressure testable. Further, the components of this system are expensive to make as well as expensive to install.

General considerations, and both present and future regulatory requirements for primary piping, dictate that the piping possess a number of basic characteristics and meet a number of general design criteria. In this regard, the secondary containment system should be of such a design that the secondary system contains the primary system from the dispenser to the tank including the submersible pump housing and all swing joints. In addition, the secondary containment system should allow for complete inspection of the primary pipe fittings during an air pressure soap test, before the secondary pipe system is completed. Further, the secondary containment system should be compatible with the products to be stored. In addition, the secondary containment system should be non-corrosive, dielectric and non-degradable, and should be resistant to attack from microbial growth. Still further, the secondary containment system, the materials used therein and the design thereof, should be of sufficient strength to withstand the maximum underground burial loads. In addition, the secondary containment fittings should be capable of being installed over the primary fittings after completion, testing and inspection of the primary piping system is complete so as to allow inspection of the primary fittings during such testing. Further, the secondary containment system should have a monitored fuel collection sump at the low end of the system which provides a fitting for insertion of a continuous monitoring sensor for signaling an alarm should a leak occur in the primary piping.

SUMMARY OF THE INVENTION

In accordance with the present invention, an improved secondary containment system is provided for steel and fiberglass primary pipelines. The system of the invention is such that it permits the primary pipeline to be completely installed, integrity tested and inspected before the secondary containment system is permanently fixed and sealed into position. Once installed, the secondary containment system of the invention performs as an air-tight guttering system, providing containment of the primary pipe from under the dispenser to the pump for the tank, including all swing joints or flex connectors. Any leak in the primary piping will flow from the high end of the system, under the product dispenser, to a collection sump, which contains the pump and associated fittings, at the low end of the system. Leakage detection can be accomplished at the collection sump by means of visual or electronic monitoring.

In accordance with the present invention, there is provided, in a pumping system for fluid products such as gasoline, diesel fuel and chemicals, and including a pump for pumping such products from a storage tank through a primary pipeline to a product dispenser, a secondary containment system for the pipeline between the storage pipe and the product dispenser which includes a secondary pipe system surrounding the primary pipeline, the secondary pipe system including telescoping pipe sections of different diameters, which is installed around the primary pipeline and which, when installed, is movable from an initial, intermediate position to a final, installed position, for enabling completion testing and inspection of the primary pipeline prior to final completion of the secondary containment system.

Preferably, the secondary containment system further comprises a fusion welding wire bond between at least two overlapping portions of the telescoping pipe sections.

In accordance with a further important aspect of the invention, the secondary containment system preferably comprises an air-test clamp assembly for, in use, enabling air pressure testing of the secondary containment system incorporating the secondary pipe system. Preferably, this test clamp assembly comprises a fitting member, clamping means for releasably clamping one end of the fitting member to the exterior of the primary pipeline and for clamping the other end of the fitting member externally of the secondary pipe system, and valve means in the fitting member for permitting connection of the fitting member to a source of air under pressure so that such air under pressure can be supplied to the secondary containment system for testing purposes. Advantageously, the test clamp assembly is affixed to a wall of a unit of the pumping system, such as the collection sump, the wall having a hole therein through which a portion of the primary pipeline extends and the test clamp assembly further comprising a coupling member including a flange affixed to the wall and a base portion extending through the wall. The clamping means preferably comprises a first clamp for clamping the one end of the fitting member to the exterior of a primary pipeline and a second clamp for for clamping the other end of the fitting to the exterior of the base portion of the coupling member. Advantageously, the fitting member is fabricated of a resilient material and comprises first and second end portions of different diameters and an intermediate portion in which the vavle means is disposed.

According to a further important feature of the invention, the secondary containment system preferably comprises leakage monitoring means incorporated in the secondary containment system for providing an indication of a leak in the primary pipeline. The leakage monitoring means preferably comprises a sump fitting having first and second spaced, aligned end portions through which a portion of the primary pipeline system extends, and a sump portion in which product from a leak can collect. Advantageously, the sump fitting is cross shaped and includes an upwardly extending observation portion, in alignment with the sump portion, for permitting observation of any product collected in the sump portion.

Typically the primary pipeline will include at least one flexing connection, such as a swing joint or a flex connector, and in such cases, the secondary containment system preferably comprises a corrugated flexible pipe in which the flexing connection is contained and clamping means for clamping the flexible pipe in place.

In accordance with a further important feature of the invention, at least one secondary fitting is provided for connecting together adjacent portions of the secondary pipe sections of the secondary containment system, the secondary fitting comprising a split fitting member having a split therein in the top surface thereof. Advantageously, the ends of the secondary fitting which define the split are shaped to define a V-groove therebetween and are joined together by a fushin rod weld.

In accordance with a further important aspect of the present invention, a method is provided for installing a piping system for fluid products such as described above (i.e., one including a pump for pumping the product from a storage tank through a primary pipeline to a product dispenser), the method comprising installing a secondary containment system, including telescoping secondary pipes, around the primary pipeline with the telescoping secondary pipes positioned in intermediate positions along the primary pipeline; testing the primary pipeline with the telescoping pipes in the intermediate positions thereof; and moving the telescoping secondary pipes to their final positions so as to enable completion of the installation of the secondary containment system. As noted above, the telescoping secondary pipes are preferably fixed in the final positions thereof using fusion wire welding, and split secondary fittings are installed over the primary fittings the primary pipeline by bending portions of the split fittings adjacent the split backwardly from the split and then installing the fittings over the primary fittings. Advantageously, the split fittings are joined to adjacent pipe sections using fusion wire welding and the portions of the split fitting adjacent to the split are joined together using fusion rod welding.

Other features and advantages of the present invention will be set forth in, or apparent from, the detailed description of preferred embodiments of the invention which follows.

BRIEF DESCRIPTION OF THE DRAWINGS

FIG. 1 is a schematic cross sectional view of an overall pumping system illustrating one stage in the assembly of the secondary containment system of the invention;

FIG. 2 is a view similar to that of FIG. 1 illustrating the piping system with the secondary containment system completely installed;

FIGS. 3a, 3b and 3c are front elevational views of further embodiments of the collection sump illustrated in FIGS. 1 and 2;

FIG. 4b is a perspective view of some of the components of the embodiment of FIG. 4a;

FIG. 5b is an exploded perspective view of two of the components of the embodiment of FIG. 5a;

FIG. 6b is a perspective view of two of the components of the embodiment of FIG. 6a;

DESCRIPTION OF THE PREFERRED EMBODIMENTS

Figure 4A:
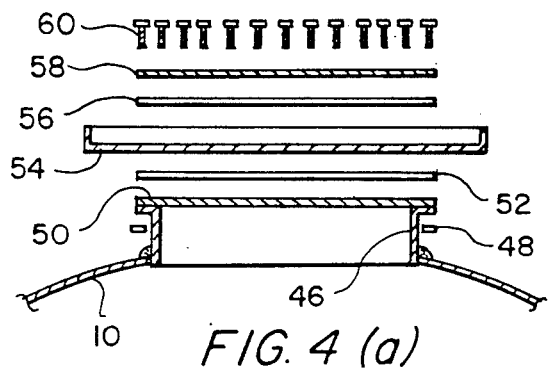
FIG. 4a is an exploded cross sectional view of a first embodiment of a mounting arrangement for the collection sump.

Referring to FIGS. 1 and 2 which illustrate the two stages in assembly of the secondary containment system of the present invention is a typical pumping system, the basic integers of the pumping system include a storage tank 10, a portion of which is shown, connected to a submersible pump 12 housed in a collection sump 14. The pump is connected through a piping system, generally denoted 16, to a standard product (e.g. gasoline) dispenser 18. Collection sump 14 is mounted on tank 10 by a mounting arrangement indicated at 10a. A number of possible embodiments of the mounting arrangement for collection sump 10 are discussed below in connection with FIGS. 4a, 4b; 5a, 5b; 6a, 6b; and 7.

Figure 14:
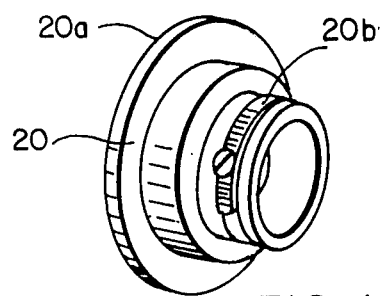
FIG. 14 is a perspective view of a close-off coupling constructed in accordance with a preferred embodiment of the invention.

Collection sump 14 includes a close-off coupling 20 which is also illustrated in FIG. 14 and which houses a riser pipe 22 that provides a connection between tank 10 and pump 12.

Figure 13:
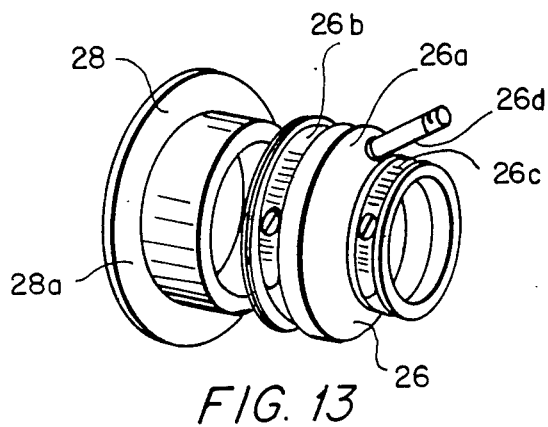
FIG. 13 is an exploded perspective view of an air test clamp assembly constructed in accordance with a preferred embodiment of the present invention.

The piping system 16 which interconnects pump 12 and dispenser 18 includes a swing joint 24 connected between pump 12 and a straight section of the primary piping 30. An air test clamp assembly 26 is mounted on a section of pipe 30 within collection sump 12 and cooperates with a flange coupling 28 affixed to a wall of collection sump 10, in a manner described below so as to enable air pressure testing of the primary piping system air test clamp assembly 26 and cooperating bulkhead coupling 28 are also illustrated in FIG. 13 and are described in more detail below in connection with the description of that figure.

As will be apparent from the foregoing, a key element of the secondary containment system of the present invention is the telescoping secondary pipe which surrounds primary pipeline 30 and which comprises a larger diameter pipe 32a and a smaller diameter pipe 32b. The telescoping piping is described in more detail below in connection with FIG. 8.

As illustrated in FIG. 1, the primary pipeline 30 includes a tee fitting 30a and a 90° elbow 30b which are used in connecting the primary pipeline to dispenser 18. The primary pipeline 30 terminates in a swing joint 40 located beneath dispenser 18.

As is also illustrated in FIGS. 1 and 2, a collection sump fitting 34 is disposed between pump 12 and tee fitting 30a (although such collection sump fittings can be installed anywhere in the system) and as illustrated in FIG. 2, collection sump fittings 34, in combination with a riser pipe 35 and a close-off cap 37, form part of an observation well used in detecting leaks in the primary pipeline system. Collection sump fitting 34 is described in more detail below in connection with FIG. 15 and FIG. 16.

As illustrated in FIG. 2, a secondary tee fitting 36 is installed around primary tee fitting 30a and a secondary 90° elbow fitting 38 is installed around primary 90° elbow fitting 30b. Tee fitting 36 is described in more detail in connection with FIG. 9 and 90° elbow fitting 38 is described in more detail in connection with FIG. 10.

As illustrated in FIGS. 1 and 2, a flexible connector 42 including a reducer coupling 44 is installed around and contains swing joint 40. Connector 42 is described in more detail in connection with FIG. 12.

As illustrated in FIGS. 1 and 2, collection sump 14 includes a cover 14a, a riser section 14b and a base or body section 14c. Collection sump 14 is preferably rotationally molded from a thick high density polyethylene and, as illustrated, is located at the low end of the piping system 16. The purposes of sump 14 include (i) acting to collect leaking product in the system, (ii) permitting access for repair or servicing of the pump 12 or the fittings therefor, and (iii) performing as a riser to keep excavation back fill away from the submersible pump 12 and the fittings therefor. The collection sump 14 is provided with flat exit and entry walls (viz. those shown in section in FIGS. 1 and 2) to accomodate the close-off coupling such as that indicated at 20.

Referring to FIGS. 3a, 3b and 3c, three further embodiments of the collection sump of FIGS. 1 and 2 are shown. The embodiment of FIG. 3a is similar to that of FIGS. 1 and 2 and includes a mounting plate 14d₁. FIGS. 3b and 3c illustrate further embodiments of different sizes and incorporating fewer, but similar components. As is illustrated by FIGS. 3a to 3c, collection sumps can be provided in a number of different shapes and sizes in order to accomodate tanks of various sizes as well as different piping applications.

Figure 4B:
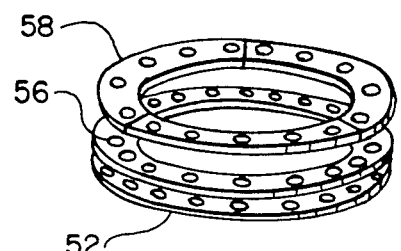

Referring to FIGS. 4a and 4b, a first embodiment of a mounting arrangement for mounting the collection sump onto the storage tank 10 is shown. In this embodiment, storage tank 10 is equipped with a manway 46, with associated manway nuts indicated at 48, and a cover 50, and the base or mounting plate 54 of the collection sump (which corresponds to, for example, base plate $14d_1$ of FIG. 3a) is pre-cut and drilled to match the bolt hole arrangement of the manway cover 50. To install this mounting, the manway nuts 48 and bolts 60 are removed and a gasket 52, also shown in FIG. 4b, is placed in position over the bolt holes of manway cover 50. Thereafter, the pre-cut and drilled collection sump base plate 54 is positioned over gasket 52 and a further gasket 56, also shown in FIG. 4b, is placed in position inside of the collection sump base plate 54. Next, a three piece compression ring 58, also shown in FIG. 4b, is placed over the gasket 56 and the manway nuts 48 and bolts 60 are replaced. The remainder of the collection sump components are assembled at a later stage.

Figure 5A:
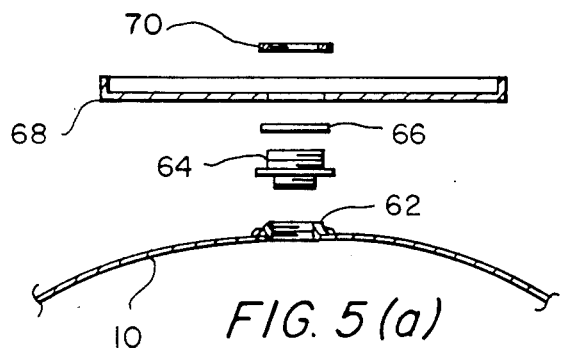
FIG. 5a is an exploded cross sectional view of a further embodiment of a mounting arrangement for the collection sump of FIGS. 1 and 2.
Figure 5B:
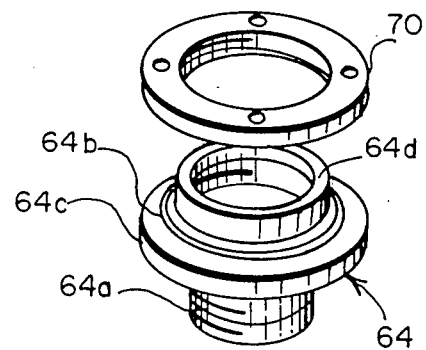

Referring to FIGS. 5a and 5b, a further embodiment of the mounting arrangement for collection sump 14 is shown wherein a sump base plate 68 (corresponding again, for example, to plate $14_d$ of FIG. 3a,) is mounted directly onto a fitting 62 in the tank 10 by means of a mounting coupling 64 which is also illustrated in FIG. 5b. In accordance with this embodiment, installation begins with screwing of a base portion 64a of coupling 64 into fitting 62 and thereafter placing an O-ring 66 into a groove 64d formed in a flange 64c of coupling 64. Next, a compression ring 70, which is best seen in FIG. 5b, is screwed down onto an upper screw threaded portion 64d of coupling 64. Again, the remainder of the components of collection sump 14 are then assembled at a later stage.

Figure 6A:
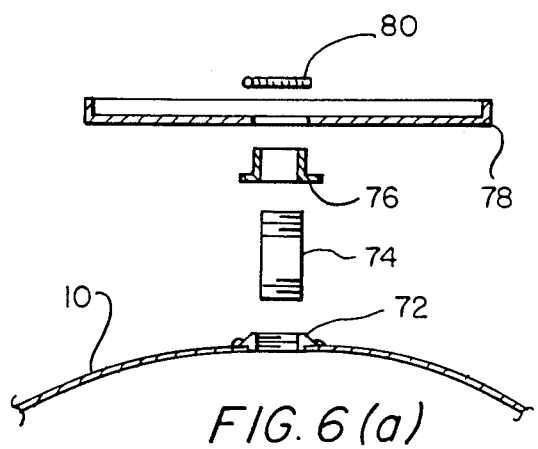
FIG. 6a is an exploded cross sectional view of yet another embodiment of a mounting arrangement for the collection sump of FIGS. 1 and 2.
Figure 6B:
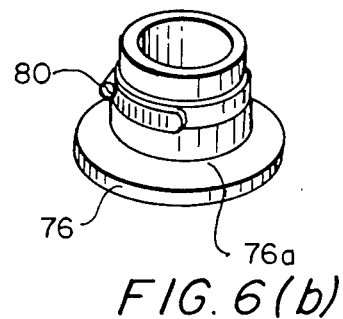

Referring to FIGS. 6a and 6b, a further embodiment of a mounting arrangement for the collection sump 14 is shown wherein the mounting base plate 78 for the collection sump (again corresponding, for example, to plate $14_d$ of FIG. 3a) is mounted directly to a riser pipe 74 (corresponding to riser pipe 22 of FIGS. 1 and 2). Riser pipe 74 screws into a tank fitting 72 (similar to fitting 62 of FIG. 6a) and the installation procedure includes drilling a hole in the collection sump base plate 78 and inserting a mounting coupling 76 (best shown in FIG. 6b), from the bottom, i.e., with flange 76a lowermost. Flange 76a is then fusion rod welded to the underside of the collection sump base plate 78 and this combination, together with clamp 80, is slid down over the riser pipe 22 and the clamp 80 tightened. As before, the remainder of the components of the collection sump are assembled at a later stage.

Figure 7:
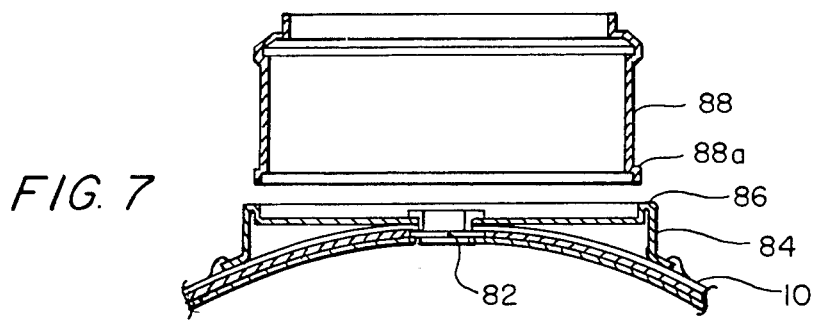
FIG. 7 is an exploded cross sectional view of yet a further embodiment of a mounting arrangement for the collection sump of FIGS. 1 and 2.

Referring to FIG. 7, an embodiment of the invention as shown wherein a base portion 88 of the collection sump, (corresponding, for example, to base portion 14c of FIGS. 1 and 2), is mounted directly on a pre-installed saddle 84 in accordance with that provided in U.S. Pat. Nos. 4,568,925 and 4,672,366, referred to above. Saddle 84 surrounds a tank fitting 82 of tank 10 and is specifically constructed to accomodate the body or base portion 88 of the collection sump. A bottom rim 88 of collection sump body 88 fits into a pre-formed retaining ring 86 of saddle 84 and the collection sump body 88 is fusion rod welded to the saddle retaining ring 86 to provide water tightness. As with the embodiments above, the remaining components of the collection sump can be assembled at a later stage.

Figure 8:
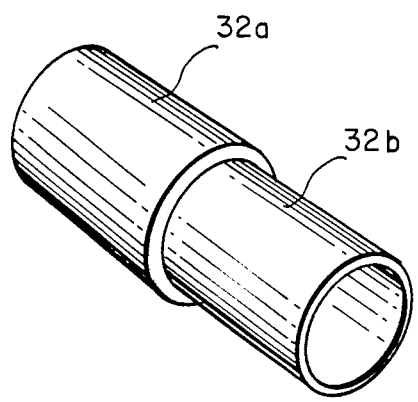
FIG. 8 is a perspective view of the telescoping secondary pipe used in the piping system of FIGS. 1 and 2.

Referring to FIG. 8, a section of telescoping pipe is shown consisting of an outer, larger diameter pipe section 32a and an inner, smaller diameter pipe section 32b, also shown in FIGS. 1 and 2. The secondary piping 32a, 32b is preferrable extruded from high density polyethylene in sizes large enough to fit over the primary piping system 30 with the inner diameter of the outer portion 32a being large enough to contain the outer diameter of inner portions 32b in addition to the added thickness of the fusion welding wire used in joining the sections together and still provide a slight clearance fit. Both sizes of pipe can be extruded from the same extrusion die by carefully adjusting the extrusion speed for the outer and inner portions 32a and 32b, respectively.

Bonding and sealing of the telescoping pipe sections 32a and 32b is provided by a welded overlap joint. High density polyethylene can generally be effectively bonded by fusion which requires the introduction of heat at temperature sufficient to melt the material. As described in more detail below in connection with FIG. 18, the present invention provides for use of a fusion welding wire which can be slipped between the overlap joint, in the form of a coil, and supplied with electric current from a suitable power supply so as to produce heat sufficient to melt the coating on the wire. This coating is made of the parent high density polyethylene material and thus produces a fusion bond at the point at contact. This fusion welding technique produces a homogeneous weld between the inner pipe section 32b and the outer pipe section 32a at the overlap joint and, as just mentioned, this welding technique is discussed in more detail hereinbelow.

Figure 9:
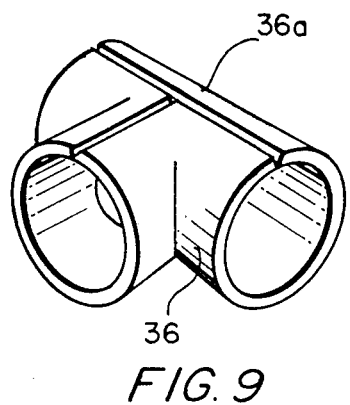
FIG. 9 is a perspective view of a secondary "tee" fitting constructed in accordance with a preferred embodiment of the invention.
Figure 10:
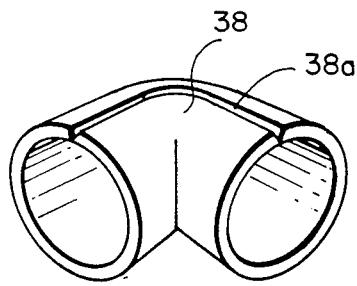
FIG. 10 is a perspective view of a 90° elbow fitting constructed in accordance with a preferred embodiment of the invention.
Figure 11:
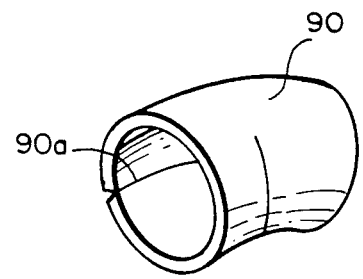
FIG. 11 is a perspective view of a 45° elbow fitting constructed in accordance with a preferred embodiment of the invention.

FIGS. 9 and 10 illustrate, respectively, the tee fitting 36, and elbow fitting 38, described above in connection with FIGS. 1 and 2, while FIG. 11 discloses a 45° elbow fitting which can be used in other pipeline patterns or arrangements. Fittings 36, 38 and 90 include corresponding V-shaped grooves 36a, 38a, and 90a, respectively, in the tops of the fittings to allow the fittings to be spread apart and fit over the corresponding pre-installed primary fitting. The fittings illustrated in FIGS. 9 to 11 are preferably made of high density polyethylene so that they are strong but flexible enough for the intended application. These fittings are preferably inside molded using a plastic forming process referred to as "rotational molding" but could also be made using a further plastic forming process referred to as "plastic injection molding". The construction of the fittings of FIGS. 9 to 11 permits installation, testing and inspection of the corresponding primary fittings before the secondary containment fittings 36, 38 and 90 are installed. The split fitting 36, 38 and 90 are bonded and sealed to the outer telescoping pipe 32a using the fusion wire welding techniqes used for an overlap joint as described above, and as described in more detail in connection with FIG. 18. After these fittings have been fusion wire welded in place, the V-shaped groove or split in the top of the fitting is fusion rod welded to completely seal the fitting. Fusion wire welding is described below in connection with FIG. 19.

Figure 12:
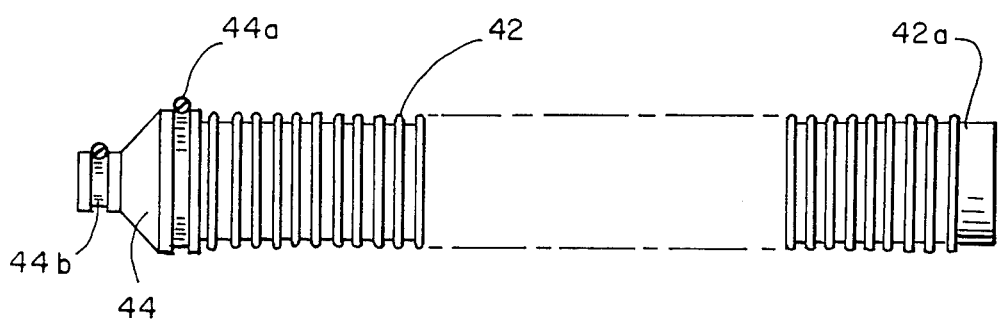
FIG. 12 is a side elevational view of a flexible connector constructed in accordance with a preferred embodiment of the present invention.

Referring to FIG. 12, a corrugated flexible pipe section 42 corresponding to that shown in FIGS. 1 and 2 is illustrated. The pipe section or connection 42 is preferably rotationally molded of high density polyethylene material and has fitted on the upper end thereof, a reducer fitting 44 corresponding to that described above.

Fitting 44 is preferably fabricated of neoprene rubber. Steel clamps 42a and 42b are used to close off the secondary containment piping system beneath product dispenser 18. The flexibility of connector 42 permits containment of a multi-directional swing joint such as that indicated at 40 in FIGS. 1 and 2. It will be appreciated that connector 42 can also be used in connection with flex connectors. The lower end of connector 42a is attached to the outer telescoping secondary containment pipe 32a by means of fusion wire welding.

Referring to FIG. 13, a test clamp assembly 26, and cooperating bulkhead coupling 28, corresponding to those shown in FIGS. 1 and 2, are illustrated. Flanged coupled 28 is preferably rotationally mounted from high density polyethylene. The clamp assembly 26 basically comprises a reducer fitting 26a, preferably fabricated of neoprene rubber; a pair of different diameter stainless steel clamps 26b and 26c; and an air valve stem 26d formed in reducer fitting 26a. Clamp assembly 26, in cooperation with bulkhead coupling 28, is used to seal off the wall of collection sump 14 at a location where a contained primary pipe 30 exits, as illustrated in FIGS. 1 and 2. Once installed, the clamp assembly 26 permits the secondary piping system to be filled with air, through the stem valve 26d, so as to permit an air pressure test to be performed for checking the containment integrity of the piping system.

To install the bulkhead coupling 28, a hole is drilled at the exit location in the collection sump wall referred to above and the bulkhead coupling 28 is inserted with the flange 28a facing outwardly. Flange 28a of bulkhead coupling 28 is then fusion rod welded to the outside wall of the collection sump 14. On the inside of the collection sump 14, the reducer fitting 26a of the clamping assembly 26 is slipper over the inwardly projecting portion of the bulkhead coupling 28 and clamped in place by clamps 26b and 26c. During assembly of the primary piping 30, this piping is installed so as to pass through the test clamp assembly 26 and associated coupling 28.

Referring to FIG. 14, a close-off coupling 20 is illustrated with corresponds to that shown in FIGS. 1 and 2. Close-off coupling 20 is used for sealing of the wall of the collection sump 14 at a location where a non-contained primary pipe (indicated at 30d in FIG. 2) exists from the collection sump 14. It will be appreciated that such a non-contained pipe can, for example, be a vent line or a vapor recovery line. To install coupling 20, a hole is drilled at the exit location in the collection sump wall and the coupling 20 is inserted with the flange 20a facing outwardly. The flange 20a is then fusion rod welded to the outside wall of the collection sump 14. On the inside of the collection sump 14, coupling 20 is directly clampled to the primary pipe 30d (FIG. 2) by means of a stainless steel clamp 20b. Close-off coupling 20 is preferably made of rotationally molded, high-density polyethylene.

Figure 15:
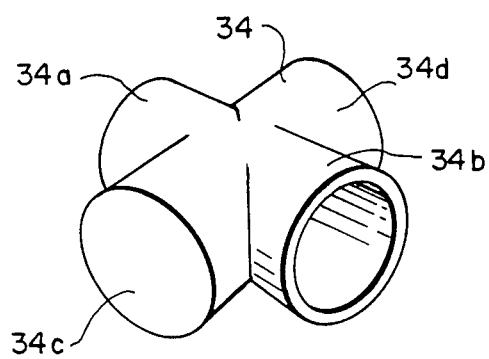
FIG. 15 is a perspective view of a collection sump fitting constructed in accordance with a preferred embodiment of the invention.
Figure 16:
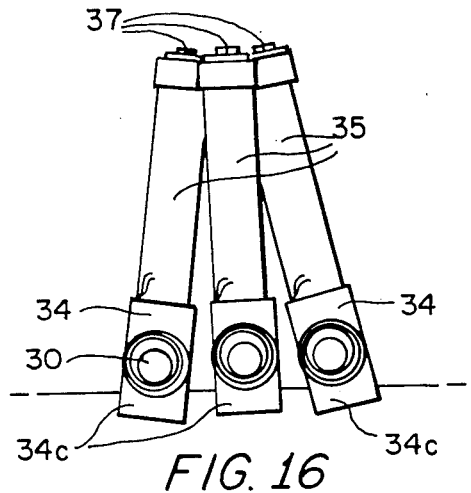
FIG. 16 is a front elevational view, partially in section, of a plurality of pipes incorporating collection sump fittings corresponding to that illustrated in FIG. 12 and forming a plurality of observation wells.

As noted above, in accordance with a preferred embodiment of the present invention, the primary piping is installed so as to slope downwardly from the product dispenser 18 to the collection sump 14 so that any leakage in the primary system will flow to the collection sump. Referring to FIGS. 15 and 16, a cross-shaped sump collection fitting 34, corresponding to that referred to above in connection with FIGS. 1 and 2, is shown which is adapted to be installed at any point between the product dispenser 18 and the collection sump 14 to enable the approximate location of a leak to be determined. Collection sump fitting 34 includes aligned arms 34a and 34b which are bonded to adjacent pipe sections 32a as well as a closed collection sump portion 34c which extends downwardly, in use, so that the product will collect therein. An upwardly extending portion 34d is bonded to riser pipe 35 which is closed off by a neoprene cap 37. With cap 37 removed, one can look down riser pipe 35 into sump portion 34c to determine if there has been product leakage. It will be appreciated that any leakage in the primary pipe between the observation well and the fuel dispenser 18 will flow to and collect in, sump portion 34c.

As illustrated in FIG. 16, where a plurality of pipes are positioned adjacent one another, the collection sump fittings 34, and their associated riser pipes 35, are preferably tilted towards the center so that the corresponding collections sump portions 34c can be observed from a central area and can be accomodated underneath the same observation manhole.

During installation of the primary piping system 16, the telescoping secondary pipe sections 32a and 32b are fitted over each straight section of the primary pipeline 30 and telescoped back away from the primary fittings 30a and 30b (fittings in FIGS. 1 and 2) so as to not interfere with the assembly of these fittings in the primary piping 30. The length of the telescoping sections 32a and 32b are slightly greater than one-half of the length of the length of straight section of primary pipe 30 between the primary fittings to allow for overlap. Each piping run, i.e., each length of pipe between the fittings, should begin and end with an outer telescopic section 32a, with an inner telescopic section 32b therebetween. The telescoping feature of the secondary containment pipe permits the pipe to be shifted back from the assembly area of the primary pipe 30 and then shifted back and forth to permit complete inspection of the primary pipe 30 (and the primary joints or fittings 30a and 30b) during testing of the primary piping system prior to placing the piping system in service.

Figure 17:
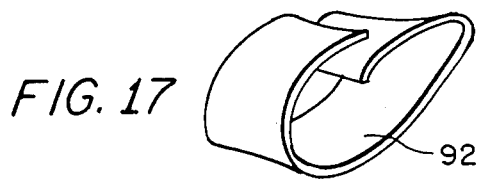
FIG. 17 is a perspective view of patch material used for sealing a leaking overlap joint.

Referring to FIG. 17, a "last resort" patch 92 is shown which is used to provide sealing of a leaking overlap joint. Patch 92 is formed by wrap-around heat shrink material which is wrapped around a leaking overlap joint. The surface of the material is evenly heated with the hot air and the material will, as a consequence, begin to shrink and tighten around the joint. Patch 92 includes an adhesive (not shown) on the underside thereof which softens and fills any pin hole leaks which exist.

Figure 18:
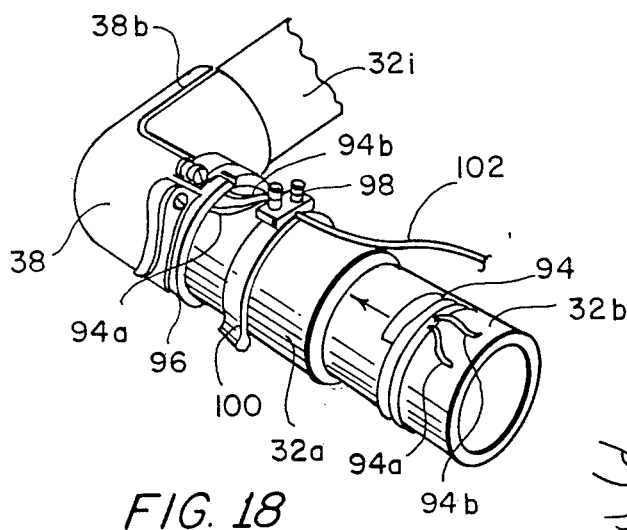
FIG. 18 is a perspective view illustrating the use of fusion wire welding in joining pipe sections together.

Referring to FIG. 18, an illustration is provided of the use of fusion weld wiring in joining pipe sections together. The piping shown in FIG. 18 includes outer pipe sections 32a bonded to a 90° elbow fitting 38 and a telescoping inner pipe section 32b about to be bonded to one of the outer pipe sections 32a after being moved into an overlap position.

The fusion wire used in fusion wire welding comprises a wire ribbon, approximately ¼ inch in width and 50 mils in thickness. The ribbon is made up of 24 gauge resistive wire, 70% copper and 30% nickel alloy with a resistance of 0.75 ohms per lineal foot. Preferably four parallel strands of wire coated with high density polyethelene material, corresponding to that used in fabricating the secondary containment pipe and fittings, are used in a welding operation. The length of the wire ribbon is 36 inches with the strip wire ends being connected in such a manner so as to create a single wire circuit with two, 4 inch connector wires 94a, 94b being located on the same end. The profile of the wire ribbon includes a female and male interlock snap on opposite sides so as to permit the wire ribbon to form a set coil when wrapped around the telescoping pipe section 32a, 32b. As the wire ribbon is being wrapped, the male (barbed) edge snaps into itself as it meets the female edge so as to permit a tight and stable coil to be formed around the secondary pipe which can then be shifted down the pipe into and between the overlap joint created by the outer and inner telescoping pipe sections 32a and 32b.

The latter is illustrated in FIG. 18 where inner pipe section 32b includes a coil 94 of fusion wire ribbon wound thereon which is being moved in the direction indicated by the arrow into the overlap joint between pipe sections 32a and 32b. Once inserted into the overlap joint, with the two connector wires indicated at 94a and 94b extending outwardly therefrom, a steel clamp 96 is installed around the outer telescoping pipe 32a directly over the coiled wire ribbon inside the overlap joint. This is illustrated in FIG. 18 by the overlap joint between section 32a and elbow fitting 38. As illustrated, the two connector wires or leads 94a and 94b are attached to the terminals 98 of a terminal block clamp 100. Clamp 100 snaps onto the pipe section 32a so as to prevent movement of the connector wire leads 92a and 92b during the fusion welding process. The terminal block clamp 100 is connected to the fusion power unit (not shown) by a long (e.g. sic foot) cord 102.

By pressing the start button on the fusion power unit, current is delivered from a 24 volt supply to the fusion welding ribbon of the coil 94. The resistance of the ribbon causes the wires to become hot and create sufficient heat to produce a fusion bond between the outer and inner telescoping pipe sections 32a and 32b. Advantageously, the fusion power unit delivers current for a predetermined amount of time after which power is automatically terminated. It will be appreciated that such a fusion welding procedure can also be used at overlap joints where the outer telescoping pipe 32a is connected to the various fittings and couplings referred to above.

Figure 19:
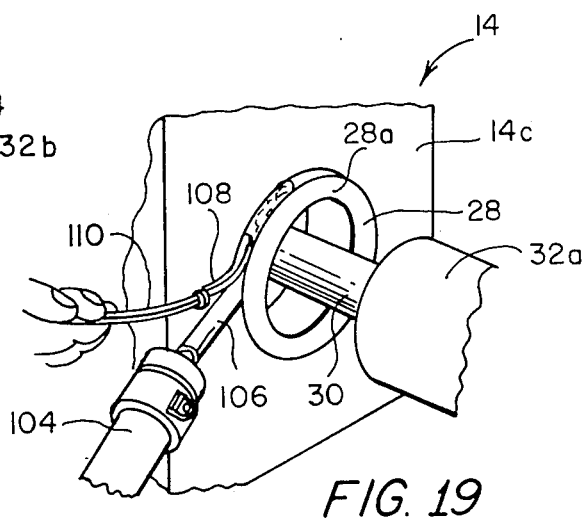
FIG. 19 is a perspective view illustrating the use of fusion rod welding.

Referring to FIG. 19, the fusion rod welding process referred to above is illustrated. The process involves the use of a hot air gun, a portion of which is indicated at 104, that is equipped with a nozzle tip 106 having a offset receiving shaft portion 108 adapted to receive therein a V-shaped plastic rod 110. The plastic rod 110 is inserted into receiving shaft 108 of nozzle tip 106 where the rod 110 is heated and applied to the surface area of a joint to be welded. In the illustrated example, flange 28a of a bulkhead coupling 28 is being welded to the wall of collection sump 14. The hot air gun 104 reheats the surface of the joint as the semi-melted rod 110 is being laid. This produces a strong homogeneous weld. Such a fusion rod welding process is used in bonding the top grooves of the fittings described above as well as around the flange 28a of the bulkhead fitting 28 (as illustrated in FIG. 19) and around the flange 20a of the close-off fitting 20.

Although the invention has been described relative to exemplary embodiments thereof, it will be understood by those skilled in the art that variations and modifications can be effected in these exemplary embodiments without departing from the scope and spirit of the invention.

I claim:

1. In a pumping system for fluid products, such as gasoline, diesel fuel and chemicals, and including a pump for pumping such products from a storage tank through a primary pipeline to a product dispenser, the improvement comprising a secondary containment system for the pipeline between the storage tank and the product dispenser and including a secondary pipe system surrounding said primary pipeline, said secondary pipe system including telescoping pipe sections of different diameters, which are installed around the primary pipeline and which are, prior to final installation, movable between intermediate and final positions, for enabling completion, testing and inspection of the primary pipeline prior to final completion of the secondary containment system.

2. A pumping system as claimed in claim 1 wherein said secondary containment system further comprises a fusion welding wire bond between at least two overlapping portions of said telescoping pipe sections for bonding said sections in the final positions thereof.

3. A pumping system as claimed in claim 1 further comprising an air test clamp assembly for, in use, enabling air pressure testing of the secondary containment system incorporating said secondary pipe system.

4. A pumping system as claimed in claim 3 wherein said air test clamp assembly comprises a fitting member, clamping means for releasably clamping one end of the fitting member to the exterior of the primary pipeline and for clamping the other end of the fitting member externally of the secondary pipe system, and valve means in said fitting member for permitting connection of the fitting member to a source of air under pressure so that air under pressure can be supplied to the secondary containment system.

5. A pumping system as claimed in claim 4, wherein said air test clamp assembly is affixed to a wall of a unit of the pumping system, said wall having a hole therein through which a portion of said primary pipeline extends and, said test clamp assembly further comprising a coupling member including a flange affixed to said wall and a base portion extending through said wall, said clamping means comprising a first clamp for clamping said one end of said fitting member to the exterior of said portion of the primary pipeline and a second clamp for clamping said other end of said fitting to the exterior of the base portion of said coupling member.

6. A pumping system as claimed in claim 5 wherein said fitting member is fabricated of a resilient material and comprises first and second spaced end portions of different diameters and an intermediate portion in which said valve means is disposed.

7. A pumping system as claimed in claim 1 further comprising leakage monitoring means incorporated in said secondary containment system for providing an indication of a leak in the primary pipeline.

8. A pumping system as claimed in claim 7 wherein said leakage monitoring means comprises a sump fitting having first and second spaced, aligned end portions through which a portion of the primary pipeline system extends, and a sump portion in which product from a leak can collect.

9. A pumping system as claimed in claim 8 wherein said sump fitting is cross shaped and includes an upwardly extending observation portion, in alignment with said sump portion for permitting observation of any product collected in the sump portion.

10. A pumping system as claimed in claim 1 wherein said primary pipeline includes at least one flexing connection and said secondary containment system comprises a corrugated flexible pipe in which said flexing connection is contained and clamping means for clamping said flexible pipe in place.

11. A pumping system as claimed in claim 10 wherein said flexing connection comprises a swing joint.

12. A pumping system as claimed in claim 1 further comprising at least one secondary fitting for connecting together adjacent portions of the secondary pipe sections of the secondary containment system, said secondary fitting comprising a split fitting member having a split therein in the top surface thereof.

13. A pumping system as claimed in claim 12 wherein the ends of the secondary fitting which define said split are shaped to define a V-groove therebetween and are joined together by a fusion rod weld.

14. A system as claimed in claim 1 wherein said pumping system includes a collection sump and the primary piping slopes downwardly between said dispenser and said collection sump so that any leakage in the primary piping system will flow to the collection sump.

15. A system as claimed in claim 14 wherein said collection sump includes flat exit and entry walls.

16. A method of installing a piping system for fluid products including a pump for pumping said product from a storage tank through a primary pipeline to a product dispenser, said method comprising installing a secondary containment system, including telescoping secondary pipes, around said primary pipeline with the telescoping secondary pipes positioned in intermediate positions along the primary pipeline; testing said primary pipeline with the telescoping pipes positioned in said intermediate positions; and moving telescoping secondary pipes to final positions to enable completing of the installation of the secondary containment system.

17. A method as claimed in claim 16 wherein said telescoping secondary pipes are fixed in the final positions thereof using fusion wire welding.

18. A method as claimed in claim 16 wherein primary pipeline includes at least one primary fitting therein and said secondary containment system further includes at least one secondary fitting, having a split therein, which interconnects adjacent sections of said secondary pipe system, portions of said secondary fitting adjacent the split being bent backwards from the split and the secondary fitting then being installed over said primary fitting.

19. A method as claimed in claim 17 further comprising joining said split fitting to said adjacent pipe sections using fusion wire welding and joining together the portions of the split fitting adjacent the split using fusion rod welding.

20. A method as claimed in claim 19 wherein said primary pipeline includes at least one primary flexing connection and said method further comprises installing a hollow corrugated flexible connector over said primary flexing connection and securing one end of said flexible connector to an adjacent section of secondary pipe system.

* * * * *